US010893394B2

(12) United States Patent
Chen et al.

(10) Patent No.: US 10,893,394 B2
(45) Date of Patent: Jan. 12, 2021

(54) DEVICES AND METHODS ARRANGED TO SUPPORT USER COMMUNICATION DEVICE GROUPING IN A COMMUNICATION NETWORK

(71) Applicant: HUAWEI TECHNOLOGIES CO., LTD., Guangdong (CN)

(72) Inventors: Junting Chen, Antibes (FR); David Gesbert, Roquefort-les-Pins (FR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/395,048

(22) Filed: Apr. 25, 2019

(65) Prior Publication Data

US 2019/0253846 A1    Aug. 15, 2019

Related U.S. Application Data

(63) Continuation of application No. PCT/EP2016/075803, filed on Oct. 26, 2016.

(51) Int. Cl.
*H04W 4/08* (2009.01)
*H04W 8/00* (2009.01)
(Continued)

(52) U.S. Cl.
CPC ............ *H04W 4/08* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS

2012/0322484 A1* 12/2012 Yu .................. H04W 8/186
455/509
2016/0021526 A1    1/2016 Niu et al.
(Continued)

FOREIGN PATENT DOCUMENTS

CN        105451211 A     3/2016
CN        105659677 A     6/2016
(Continued)

OTHER PUBLICATIONS

Ansuman Adhikary et al:"Joint Spatial Division and Multiplexing", Sep. 6, 2012, XP055124712, 44 pages.
(Continued)

*Primary Examiner* — Saumit Shah
(74) *Attorney, Agent, or Firm* — Fish & Richardson P.C.

(57) ABSTRACT

The present disclosure relates to user communication devices and communication network devices, both arranged to support grouping of user communication devices in a communication network. One example user communication device determines a neighbor user communication device set comprising the user communication device and neighbor user communication devices, and determines, by communicating with the neighbor user communication devices of the neighbor user communication device set via D2D communication, a user communication device group that the user communication device joins. The communication network device receives information on a plurality of user communication device groups, determined by user communication devices in the communication network, and executes clustering on the plurality of user communication device groups.

18 Claims, 6 Drawing Sheets

(51) Int. Cl.
*H04W 76/14* (2018.01)
*H04B 7/0452* (2017.01)
*H04B 7/0456* (2017.01)
*H04W 72/04* (2009.01)

(52) U.S. Cl.
CPC ......... *H04W 8/005* (2013.01); *H04W 72/042* (2013.01); *H04W 76/14* (2018.02)

(56) References Cited

U.S. PATENT DOCUMENTS

| | | | |
|---|---|---|---|
| 2016/0081020 A1 | 3/2016 | Rahman et al. | |
| 2016/0119854 A1* | 4/2016 | Guo .................. | H04W 40/32 370/315 |
| 2016/0198316 A1 | 7/2016 | Lakshmi Narayanan et al. | |
| 2016/0366565 A1* | 12/2016 | Fjelberg ................ | H04W 8/186 |
| 2017/0170881 A1 | 6/2017 | Chae et al. | |

FOREIGN PATENT DOCUMENTS

| | | |
|---|---|---|
| CN | 105848097 A | 8/2016 |
| WO | 2015084104 A1 | 6/2015 |
| WO | 2015170147 A1 | 11/2015 |
| WO | 2016066231 A1 | 5/2016 |

OTHER PUBLICATIONS

Junyoung Nam et al:"Joint spatial division and multiplexing:Realizing massive MIMO gains with limited channel state information". Information Sciences and Systems(CISS), 2012 46th Annual Conference on, IEEE, Mar. 21, 2012, pp. 1-6, XP032241512.

Junyoung Nam et al, Joint Spatial Division and Multiplexing: Opportunistic Beamforming, User Grouping and Simplified Downlink Scheduling. IEEE Journal of Selected Topics in Signal Processing, vol. 8, No. 5, Oct. 2014, 15 pages.

Yi Xu et al, User Grouping for Massive MIMO in FDD Systems: New Design Methods and Analysis. IEEE Access, vol. 2, pp. 947-959, 2014.

International Search Report and Written Opinion issued in International Application No. PCT/EP2016/075803 dated Aug. 30, 2017, 24 pages.

Office Action issued in Chinese Application No. 201680090234.7 dated Apr. 23, 2020, 18 pages (with English translation).

EPO Communication pursuant to Article 94(3) EPC issued in European Application No. 16788496.4 dated Mar. 11, 2020, 8 pages.

\* cited by examiner

DEVICES AND METHODS ARRANGED TO SUPPORT USER COMMUNICATION DEVICE GROUPING IN A COMMUNICATION NETWORK

CROSS-REFERENCE TO RELATED APPLICATIONS

This application is a continuation of International Application No. PCT/EP2016/075803, filed on Oct. 26, 2016, which is incorporated herein by reference in its entirety.

TECHNICAL FIELD

The present application is directed to devices and methods arranged to support grouping of communication devices in a communication network for enhancing communication in the communication network.

BACKGROUND

In MIMO (Multiple Input Multiple Output) systems, in particular, in massive MIMO systems, two-layer precoding and user grouping or user communication device grouping respectively are introduced to reduce instantaneous processing complexity, to improve handling of growing data traffic in communication network and, thus, to enhance communication in the communication network. However, to partition the users or their communication devices respectively into groups, the user communication devices need to feedback complete channel covariance matrices to a communication network device such as the base station (BS), which could induce a huge signaling overhead as the matrix has a very large dimension. In addition, the current user communication device grouping algorithms need to compute over all covariance matrices of the user communication devices, having large dimensions. Hence, the computational complexity in the MIMO systems is large and also increases with growing communication traffic.

Current techniques perform user communication device grouping at the BS based on a centralized processing on all the channel covariance matrices of the user communication devices. However, the centralized processing has at least the following three main disadvantages. First, a huge signaling overhead is induced, because in frequency-division-duplex (FDD) systems, user communication devices need to feedback the complete or full covariance matrices, which have quite a lot of elements due to the large number of transmit antennas in massive MIMO systems. The second disadvantage is founded on the large dimensions of the covariance matrices. The processing of all covariance matrices having large dimensions is complex, requires large number of processing resources, and is slow. This makes it difficult to manage a large number of user communication devices. In the age of communication technology, however, the number of user communication devices communicating with each other grows rapidly. Third, the algorithms under the existing mechanisms suffer from poor local optimum, since they fail to exploit the proximity (geographic) information from the user communication devices and consequently suffer from bad initial points to the algorithm iteration.

Therefore, there is a growing need for methods and devices that allow the reduction of both the signaling overhead and the computational complexity at the communication network devices such as BS, while maintaining similar sum rate performance of the system.

SUMMARY

Consequently, the object of the present application is to provide an improved user communication device grouping in a communication network for enhancing communication in the communication network. In particular, a user communication device grouping is desired that overcomes at least one of the above-mentioned drawbacks.

The object of the present application is achieved by the solution provided in the enclosed independent claims. Advantageous implementations of the present application are further defined in the respective dependent claims, in the present description, and/or in the appended figures.

The present application proposes a mechanism that overcomes at least the above-mentioned drawbacks. The present application suggests an execution of the user communication device grouping in two phases. In the first phase, user communication device groups are determined or generated by user communication devices to be grouped. The user communication devices know their neighbors via device-to-device (D2D) communication and, thus, are able to execute a self-organized grouping in view of this neighborhood knowledge. In the second phase, the communication network device executes clustering on the user communication devices, determined or generated by the user communication devices themselves in the first phase. Via the clustering, two or more groups generated or determined by the user communication devices may be joined together if necessary or useful. Thus, groups of larger size are determined or generated in the second phase.

In this way, an efficient user communication device grouping is executed. The above-listed drawbacks become surmountable. According to the present application, significantly lower feedback overhead arises. The amount of computations at the communication network device is reduced. Further, the performance in the communication network in general is improved.

According to a first aspect, a user communication device is provided, that is arranged to support grouping of user communication devices in a communication network, wherein the user communication device is configured to communicate with further user communication devices in the communication network via a device-to-device, D2D, communication and is additionally configured to communicate with the further user communication devices via a communication network device, wherein the user communication device is configured to execute the following when supporting the grouping of user communication devices in the communication network: determining a neighbor user communication device set comprising the user communication device and neighbor user communication devices, which are arranged to communicate in the communication network and which are adjacent to the user communication device in the communication network; and determining, by communicating with neighbor user communication devices of the neighbor user communication device set via the D2D communication, among user communication devices of the neighbor user communication device set a user communication device group that the user communication device joins; wherein information on the user communication device group is provided to the communication network device.

In a first possible implementation according to the first aspect, the user communication device is configured to determine the user communication device group by analyzing different possible groups among the user communication devices of the neighbor user communication device set.

In a second possible implementation form according to the first aspect as such or according to the first implementation form of the first aspect, the user communication device is configured to acquire, for a possible group of different possible groups among the user communication devices of the neighbor user communication device set, an outer precoder matrix of the possible group and to decide, based on the outer precoder matrix of the possible group, whether the user communication device will join the possible group.

In a third possible implementation form according to the first aspect as such or according to the any of the preceding implementation forms of the first aspect, the user communication device is configured to determine, for a possible group of different possible groups among the user communication devices of the neighbor user communication device set, a corresponding estimated ratio of received signal energy of joining the possible group over a received signal energy of staying ungrouped and to decide, based on the corresponding estimated ratio, whether the user communication device will join the possible group.

In a fourth possible implementation form according to the second or third implementation form of the first aspect, the user communication device is configured to determine the corresponding estimated ratio of received signal energy of joining the respective possible group over a received signal energy of staying ungrouped by use of the outer precoder matrix of the possible group.

In a fifth possible implementation form according to the third or fourth implementation form of the first aspect, if the estimated ratio of received signal energy of joining the possible group of different possible groups among the user communication devices of the neighbor user communication device set over a received signal energy of staying ungrouped is greater than or equal to a predetermined threshold, the user communication device is configured to determine the possible group as the user communication device group that the user communication device joins; and if, for all different possible groups among the user communication devices of the neighbor user communication device set, the respective estimated ratio of received signal energy of joining the respective possible group over the received signal energy of staying ungrouped is lower than the predetermined threshold, the user communication device is configured to generate a new group as the user communication device group that the user communication device joins.

In a sixth possible implementation form according to any one of the third to fifth implementation forms of the first aspect, the user communication device is configured to determine the estimated ratio of received signal energy of joining a possible group of different possible groups among the user communication devices of the neighbor user communication device set over the received signal energy of staying ungrouped as follows:

$$\eta_k(g) = \frac{tr\{V_g^H R_k V_g\}}{\varphi(R_k, M)},$$

wherein $\eta_k(g)$ is the estimated ratio of received signal energy of joining the respective possible group over the received signal energy of staying ungrouped, g is the respective possible group, k refers to the user communication device as the k-th user communication device of the neighbor user communication device set, $V_g$ is an outer precoder matrix of the respective possible group, $V_g^H$ is a Hermitian of the outer precoder matrix $V_g$, $R_k$ is a covariance matrix of a downlink channel between the user communication device and the communication network device, and $\varphi(R_k, M)$ is a sum of largest M eigenvalues of the covariance matrix $R_k$, wherein M is an integer that is greater than or equal to 1.

In a seventh possible implementation form according to any one of the third to fifth implementation forms of the first aspect, if user communication devices of a possible group of different possible groups among the user communication devices of the neighbor user communication device set is located in a cell of the communication network that is different from the cell, in which the user communication device is located, the user communication device is configured to determine the estimated ratio of received signal energy of joining the respective possible group of different possible groups among the user communication devices of the neighbor user communication device set over the received signal energy of staying ungrouped as follows:

$$\eta_k(b, g) = \frac{tr\{V_{b,g}^H R_k^{(b)} V_{b,g}\}}{\varphi(R_k^{(b)}, M)},$$

wherein $\eta_k(b,g)$ is the estimated ratio of received signal energy of joining the respective possible group g in the cell b, in which the user communication devices of the respective possible group g are located, over the received signal energy of staying ungrouped, k refers to the user communication device as the k-th user communication device of the neighbor user communication device set, $V_{b,g}$ is an outer precoder matrix of the respective possible group in the cell b, $V_{b,g}^H$ is a Hermitian of the outer precoder matrix $V_{b,g}$, $R_k^{(b)}$ is a covariance matrix of a downlink channel between the user communication device and the communication network device in the cell b, and $\varphi(R_k^{(b)}, M)$ is a sum of largest M eigenvalues of the covariance matrix $R_k^{(b)}$, wherein M is an integer that is greater than or equal to 1.

In an eighth possible implementation form according to the first aspect as such or according to the any of the preceding implementation forms of the first aspect, after joining the user communication device group, the user communication device is configured to transmit its covariance matrix to at least one user communication device of the user communication device group.

In a ninth possible implementation form according to the first aspect as such or according to the any of the preceding implementation forms of the first aspect, the user communication device is a group leader of the user communication device group if the user communication device has, among the user communication devices of the user communication device group, the best D2D connection and the best uplink channel quality.

In a tenth possible implementation form according to the first aspect as such or according to the any of the preceding implementation forms of the first aspect, if the user communication device is a group leader of the user communication device group, the user communication device is configured to transmit the information on the user communication device group to the communication network device.

In an eleventh possible implementation form according to the first aspect as such or according to the any of the preceding implementation forms of the first aspect, the information on the user communication device group comprises an group aggregate covariance matrix, in which covariance matrixes of the user communication devices of the user communication device group are aggregated, wherein each covariance matrix is a covariance matrix of a downlink channel between the respective user communication device of the user communication device group and the communication network device.

In a twelfth possible implementation form according to the eleventh implementation form of the first aspect, The user communication device according to claim 12, wherein the group aggregate covariance matrix is determined as follows:

$$\tilde{R}_g = \frac{1}{|\mathcal{U}_g|} \Sigma_{k \in \mathcal{U}_g} R_k,$$

wherein $\tilde{R}_g$ is the group aggregate covariance matrix, $R_k$ is a covariance matrix of a downlink channel between the k-th user communication device of the user communication device group and the communication network device, and $U_g$ is the user communication device group.

According to a second aspect, a method is provided that is arranged to support grouping of user communication devices in a communication network and arranged for execution by a user communication device, wherein the user communication device is configured to communicate with further user communication devices in the communication network via a device-to-device, D2D, communication and is additionally configured to communicate with the further user communication devices via a communication network device, wherein the method comprises the following steps for supporting the grouping of user communication devices in the communication network: determining a neighbor user communication device set comprising the user communication device and neighbor user communication devices, which are arranged to communicate in the communication network and which are adjacent to the user communication device in the communication network; and determining, by communicating with neighbor user communication devices of the neighbor user communication device set via the D2D communication, among user communication devices of the neighbor user communication device set a user communication device group that the user communication device joins; wherein information on the user communication device group is provided to the communication network device. In particular, the method reflects the actions executed by the user communication device as introduced above and explained in more detail below.

According to a third aspect, a communication network device is provided that is arranged to support grouping of user communication devices in a communication network, wherein the communication network device is configured to: receive information on a plurality of user communication device groups, determined by user communication devices in the communication network; and execute clustering on the plurality of user communication device groups.

In a first possible implementation according to the third aspect, the communication network device is configured to join at least two user communication device groups of the plurality of user communication device groups to one user communication device group when executing the clustering.

In a second possible implementation according to the third aspect as such or according to the first possible implementation of the third aspect, the communication network device is configured to execute the clustering by executing K-mans based algorithm or a graphical algorithm on the plurality of user communication device groups.

In a third possible implementation form according to the third aspect as such or according to the any of the preceding implementation forms of the third aspect, the communication network device is configured to receive for each user communication device group of the plurality of user communication device groups a corresponding information on the respective user communication device group.

In a fourth possible implementation form according to the third implementation form of the third aspect, the communication network device is configured to receive the corresponding information on the respective user communication device group from a user communication device of the user communication device group.

In a fourth aspect, a method is provided that is arranged to support grouping of user communication devices in a communication network and arranged for execution by a communication network device, wherein the method comprises the following steps: receiving information on a plurality of user communication device groups, determined by user communication devices in the communication network; and executing clustering of the at least two user communication device groups. In particular, the method reflects the actions executed by the communication network device as introduced above and explained in more detail below.

BRIEF DESCRIPTION OF DRAWINGS

The above-described aspects and implementation forms of the present application will be explained in the following description of specific embodiments in relation to the enclosed drawings, in which.

DETAILED DESCRIPTION OF EMBODIMENTS

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present application and its various steps are embodied in the functionalities of the various described apparatus elements.

Moreover, any of the embodiments and features of any of the embodiments, described herein, may be combined with each other, unless a combination is explicitly excluded.

According to the present application, an efficient way to exploit the proximity information to enhance the user communication device grouping performance. The method is built on device-to-device (D2D) communication among user communication devices. Once the user communication devices have discovered each other locally and are connected via D2D, they exchange their channel covariance matrices locally, based on which, initial local user grouping is formed through a self-organization mechanism. Then, the initial groups feedback the group covariance matrices to a communication network device such as a base station (BS) in per group basis, based on which, the communication network device computes the final grouping.

In this way, by use of the present application, for example, at least one of the following three advantages are achieved. Firstly, a significantly lower feedback overhead occurs since the covariance matrix feedback is on per group basis after the user communication device initiated grouping. Secondly, the computational complexity at the communication network device is lowered and, thus, the efficiency of the communication network device is increased, because the initial groping is performed at the user communication device side and the network communication device only needs to perform a grand grouping treating of each group, generated by user communication devices, and because the user communication device initiated grouping provides a good starting point to the grouping algorithm for faster convergence. Thirdly, a better sum rate performance is achieved, because proximity information is exploited by user communication devices, wherein said proximity information suggests that the user communication devices that are close to each other should be considered to group together. In addition, the grouping adapts finely to any topology of user communication devices in the communication network.

User communication device grouping according to the present application can be seen as being executed in two phases. Phase I is executed more on the user communication device side. In phase I, a user communication device self-organization is performed. This user communication device self-organization is executed by the user communication devices via D2D communications. This consists of the following steps: (1) each user discovers a list of neighbors; (2) each user communication device finds a neighbor user communication device group to join. A user communication device will determine a neighbor user communication device group as a group to be joined if the group provides the highest energy ratio (i.e., the estimated ratio of the received signal energy of joining the group over the received signal energy of staying ungrouped or of forming a group by the user communication device itself, respectively). If the maximum energy ratio to join an existing group is below a threshold, the user communication device forms a new group on itself. Further, a group leader is selected as the user communication device that has the best D2D connection and uplink channel quality. After a few iteration of the process, the group leader feedbacks the group information (group covariance matrix) to the communication network device such as BS.

In Phase II, based on the user communication device initiated grouping, the communication network device (e.g. a base station, BS) further clusters the user communication device groups into bigger user communication device groups. For this purpose, various known clustering algorithms can be used. Such known clustering algorithms comprise, for example, the K-means algorithm or merge-and-split algorithms. However, also further appropriate known clustering algorithms can be used.

Generally, two scenarios for executing the user communication device grouping according to the present application are possible. The two scenarios are exemplary shown in FIGS. 1 and 2.

Figure 1:
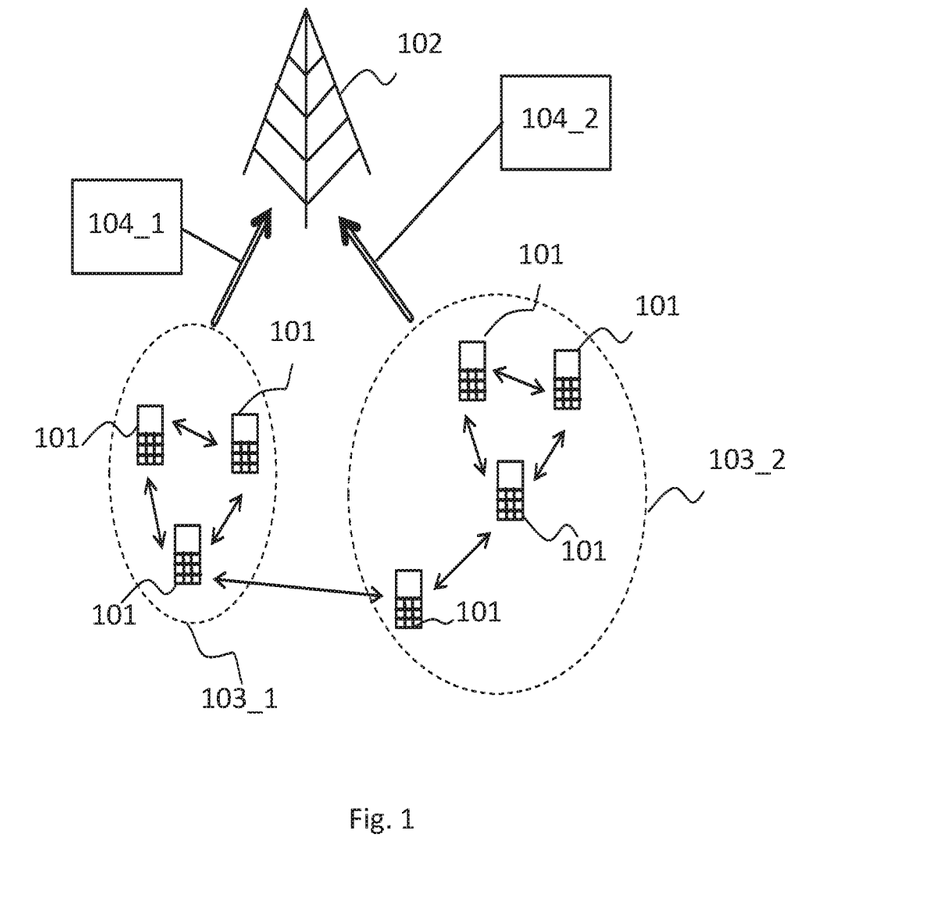
FIG. 1 shows an exemplary implementation of grouping user communication devices in a communication network according to an embodiment of the present application.

FIG. 1 shows an exemplary implementation of grouping user communication devices 101 in a communication network according to an embodiment of the present application. According to FIG. 1, a single cell of the communication network is considered. In the cell of the communication network one or more user communication devices 101 and a communication network device 102 (e.g., a BS or eNodeB) are provided. The communication network device 102 such as BS or eNodeB serves the cell of the communication network and, thus, the one or more user communication devices 101 in said cell.

According to the present embodiment, the communication network device 102 such as BS or eNodeB comprises a plurality of antennas. The communication among the devices 101, 102 operates, for example, in a frequency-division duplex (FDD) mode. Channel covariance matrices of the user communication devices 101 are acquired at the communication network device 102 such as BS or eNodeB via an explicit feedback from the user communication devices 101. The user communication devices 101 are configured to communicate with each other via the device-to-device (D2D) communication. Further, the user communication devices are configured to communicate with each other via the communication network device 102 such as BS or eNodeB. The user communication devices 101 exploit, for example, out-band D2D to establish reliable communication links between each other nearby to exchange data or information, respectively. For example, the user communication devices 101 use one of the following technologies: WiFi direct, Bluetooth, ZigBee, etc.

According to the present embodiment, the user communication devices 101 execute a self-organization into user communication device groups. In FIG. 1, two exemplary groups 103_1, 103_2 of user communication devices 101 are generated. The self-organization into the user communication device groups 103_1, 103_2 is executed via a D2D communication between the user communication devices 101, which is indicated in FIG. 1 by the bidirectional arrows between the user communication devices 101. Further, within each of the groups 103_1, 103_2, a group leader is selected who provides or feedbacks a respective group information 104_1, 104_2 to the communication network device 102 such as BS or eNodeB. The communication network device 102 such as BS or eNodeB performs, then, a global grouping based on the groups generated by the user communication devices 101. As mentioned above, for this purpose, various known clustering algorithms can be used. Such known clustering algorithms comprise, for example, the K-means algorithm or merge-and-split algorithms. However, also further appropriate known clustering algorithms can be used.

Figure 2:
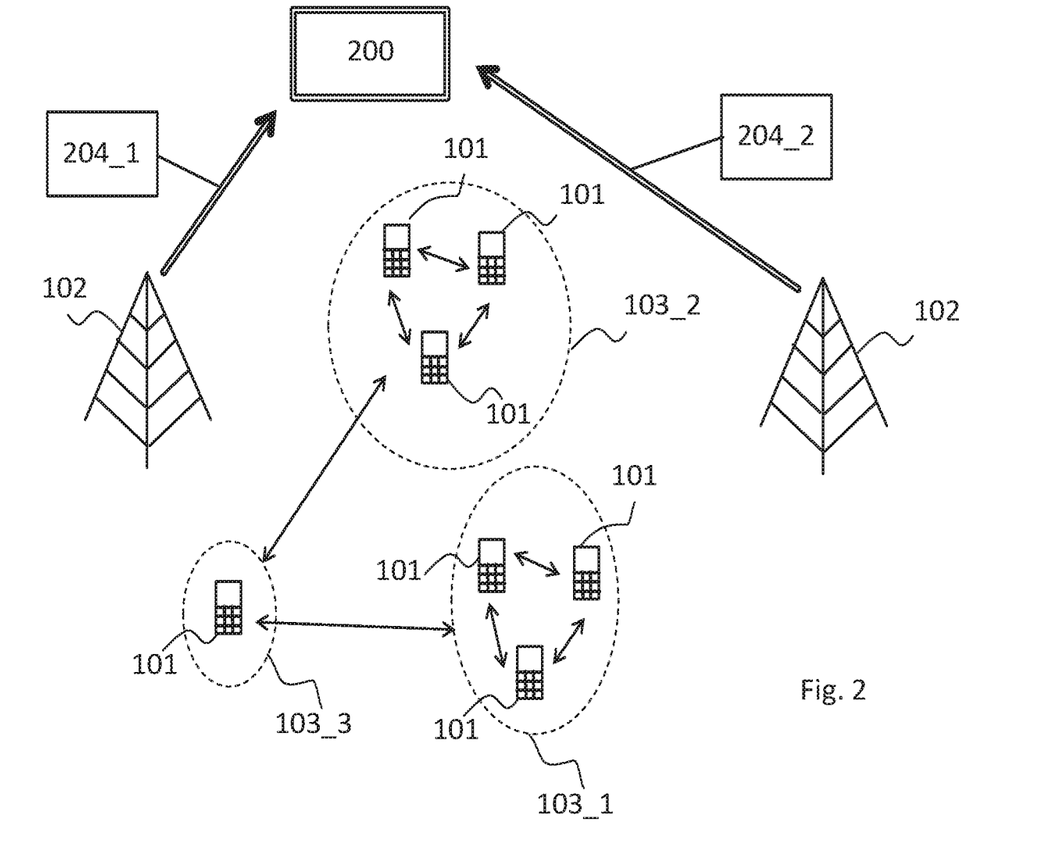
FIG. 2 shows an exemplary implementation of grouping user communication devices in a communication network according to an embodiment of the present application.

FIG. 2 shows an exemplary implementation of grouping user communication devices 101 in a communication network according to an embodiment of the present application. The embodiment of FIG. 2 is similar to the embodiment of FIG. 1. However, in FIG. 2, a multiple cell situation is considered. According to FIG. 2, two cells of the communication network are shown exemplary, wherein the present application is not limited to the two-cell example. Each one of the cells is served by a corresponding communication network device 102 such as BS or eNodeB. Thus, each one of the user communication devices 101 is served by a communication network device 102, which is located in the same cell as the respective user communication device 101.

The communication network devices 102 such as BS or eNodeB and the user communication devices 101 are arranged, for example, as explained above with regard to the embodiment of FIG. 1. For example, each one of the communication network devices 102 comprises a plurality of antennas. The communication among the devices 101, 102 operates, for example, in a frequency-division duplex (FDD) mode. Channel covariance matrices of the user communication devices 101 are acquired at the respective communication network device 102 such as BS or eNodeB via an explicit feedback from the user communication devices 101. The user communication devices 101 are configured to communicate with each other via the D2D communication. Further, the user communication devices 101 are configured to communicate with each other via the (serving) communication network device 102 such as BS or eNodeB. The user communication devices 101 exploit, for example, out-band D2D to establish reliable communication links between each other nearby to exchange data or information, respectively. For example, the user communication devices 101 use one of the following technologies: WiFi direct, Bluetooth, ZigBee, etc.

Each of the communication network devices 102 such as BS or eNodeB is configured to divide the user communication devices 101 into user communication device groups 103_1, 103_2, 103_3. It is possible that, with proper cell association and user communication device grouping, the inter-cell interference can be mitigated using only channel statistics. However, a brute-force joint user communication device grouping and cell association may require significantly signaling overhead to transmit the channel covariance matrices to the radio resource management (RRM) server and the computational complexity at the RRM server is huge. The present application provides a method to reduce the signaling overhead and simplify the grouping and cell association complexity.

Similarly to the single cell case of FIG. 1, the method of the multi-cell case of FIG. 2 consists of two phases. In the first phase, the user communication deices 101 self-organize into user communication groups 103_1, 103_2, 103_3. Specifically, a user communication device 101 chooses a group g in a cell b that potentially gives it the maximum energy ratio. After the self-organization, a group leader is selected to report the information on the respective group 103_1, 103_2, 103_3 (e.g., the grouping result and the group covariance matrix) to the respective communication network device 102 such as BS or eNodeB.

In the second phase, each of the communication network devices 102 such as BS or eNodeB transmits information 204_1, 204_2 on the respective groups 103_1, 103_2, 103_3 (e.g., the respective grouping results and the respective group covariance matrix) to a further communication network device 200 such as RRM, which further clusters the groups 103_1, 103_2, 103_3 to bigger groups jointly with cell association by use of a clustering algorithm. As mentioned above, for this purpose, various known clustering algorithms can be used. Such known clustering algorithms comprise, for example, the K-means algorithm or merge-and-split algorithms. However, also further appropriate known clustering algorithms can be used.

Figure 3:
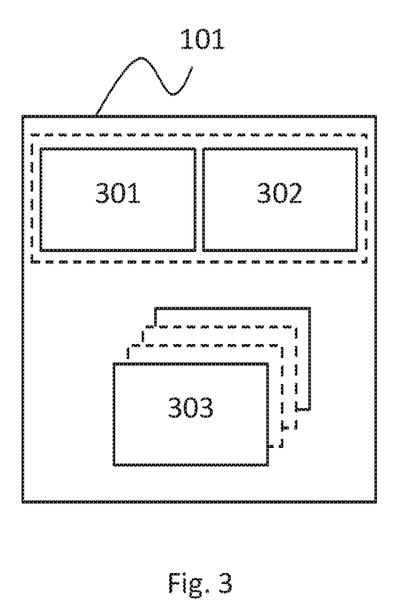
FIG. 3 shows an exemplary arrangement of a user communication device according to an embodiment of the present application.

FIG. 3 shows an exemplary arrangement of a user communication device 101 according to an embodiment of the present application. The user communication device 101 as shown in FIG. 3 is a representative of any one of the user communication devices described herein and shown in the appended figures.

According to the present embodiment, the user communication device 101 comprises a transmitting entity 301, configured to execute transmission of data in the communication network, and a receiving entity 302, configured to execute reception of data in the communication network. The data transmissions and the data receptions are executed, for example, via the D2D communication and/or via a communication network device 102 such as BS or eNodeB. According to an embodiment, the transmitting entity 301 and the receiving entity 302 are provided as one entity (e.g., transceiver), as indicated in FIG. 3 by the box with dashed lines. Alternatively, the transmitting and receiving entities may respectively be a transmitter and a receiver. Thus, any one of the transmission steps, which is described herein as being executed by the user communication device 101, is executed by the transmitting entity 301. Any one of the reception steps, which is described herein as being executed by the user communication device 101, is executed by the receiving entity 302.

Further, the user communication device 101 comprises one or more processing entities or processors 303 configured to execute different processing steps, except for the transmission and reception of data, which are executed accordingly by the transmitting entity 301 and the receiving entity 302. Thus, any one of the steps, which is described herein as being executed by the user communication device 101 and which does not refer to data transmission or reception, is executed by at least one of the one or more processing entities 302.

Figure 4:
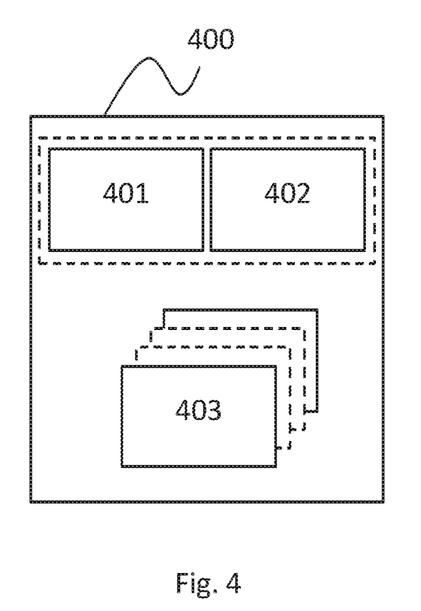
FIG. 4 shows an exemplary arrangement of a communication network device according to an embodiment of the present application.

FIG. 4 shows an exemplary arrangement of a communication network device 400 according to an embodiment of the present application. The communication network device 400 as shown in FIG. 4 is a representative of any one of the communication network devices described herein and shown in the appended figures (see, for example, the above described communication network devices 102 and 200).

According to the present embodiment, the communication network device 400 comprises a transmitting entity 401, configured to execute transmission of data in the communication network, and a receiving entity 404, configured to execute reception of data in the communication network. According to an embodiment, the transmitting entity 401 and the receiving entity 402 are provided as one entity (e.g., transceiver), as indicated in FIG. 4 by the box with dashed lines. Alternatively, the transmitting and receiving entities may respectively be a transmitter and a receiver. Thus, any one of the transmission steps, which is described herein as being executed by a communication network device 400 (see, for example, also the above described communication network devices 102 and 200), is executed by the transmitting entity 401. Any one of the reception steps, which is described herein as being executed by a communication network device 400 (see, for example, also the above described communication network devices 102 and 200), is executed by the receiving entity 402.

Further, the communication network device 400 comprises one or more processing entities or processors 403 configured to execute different processing steps, except for the transmission and reception of data, which are executed accordingly by the transmitting entity 401 and the receiving entity 402. Thus, any one of the steps, which is described herein as being executed by the communication network device 400 and which does not refer to data transmission or reception, is executed by at least one of the one or more processing entities 403.

Figure 5:
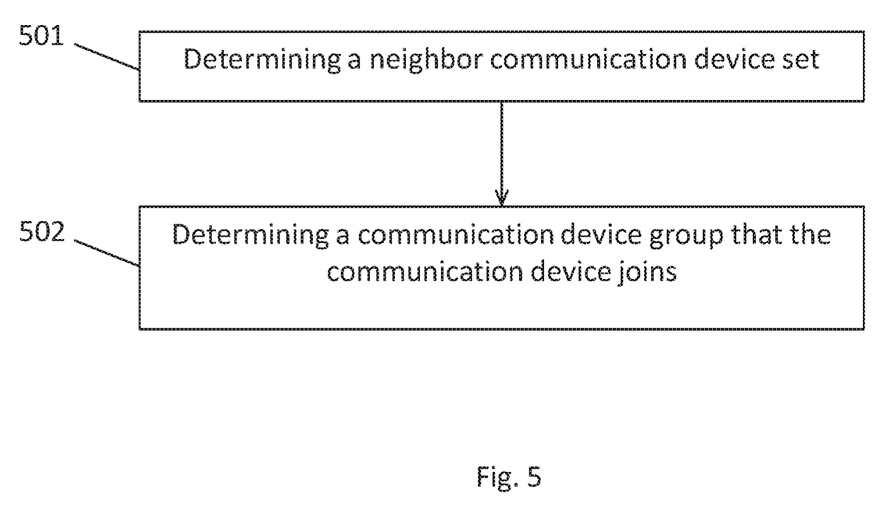
FIG. 5 shows steps executed to support grouping of user communication devices in a communication network according to an embodiment of the present application.

FIG. 5 shows steps executed to support grouping of user communication devices 101 in a communication network according to an embodiment of the present application. The steps of FIG. 5 are executed by a user communication device 101. In particular, said steps are executed by the one or more processing entities 403 of the user communication device 101. FIG. 5 reflects the steps of the above-mentioned phase I.

In step 501, a neighbor user communication device set is generated. The neighbor user communication device set comprises user communication devices 101, which are adjacent to the user communication device 101, which generates 501 the neighbor user communication device set. Additionally, the neighbor user communication device set comprises the user communication device 101 themselves. The user communication device 101 is able to detect the neighbor user communication devices 101 in the communication network by use of the D2D connections to the user communication devices 101 in the communication network.

In step 502, a user communication device group is determined by the user communication device 101, which generated 501 the neighbor user communication device set, that the user communication device 101 will join. Later on, information on the user communication device group will be transmitted to a communication network device 102 such as BS or eNodeB. The determining 502 of the user communication device group is executed by analyzing different possible groups among the user communication devices 101 of the neighbor user communication device set. Here, the user communication device 101 verifies, which of the different possible groups is the most appropriate group for the user communication device 101.

According to an embodiment, the user communication device 101 acquires, for a possible group of different possible groups among the user communication devices 101 of the neighbor user communication device set, an outer precoder matrix of the possible group and decides, based on the outer precoder matrix of the possible group, whether the user communication device 101 will join the possible group. According to an embodiment, this step is executed with regard to each one of the different possible groups. As known, the overall precoder is decomposed into an outer precoder and an inner precoder. The outer precoder suppresses the inter-cell or inter-cluster interference, while the inner precoder is used for intra-cluster multiplexing. The use of the outer precoder matrix allows a suppression of the interference between the groups determined or generated by the user communication devices 101. Further, because instead of the covariance matrix of the user communication device the outer precoder matrix of the possible group is handled and because the outer precoder matrix has significantly less dimensions as the covariance matrix, the communication and signaling overhead is reduced in the communication network.

According to an embodiment, the user communication device 101 determines, for a possible group of different possible groups among the user communication devices 101 of the neighbor user communication device set, a corresponding estimated ratio of received signal energy of joining the possible group over a received signal energy of staying ungrouped and to decide, based on the corresponding estimated ratio, whether the user communication device 101 will join the possible group. According to an embodiment, this step is executed with regard to each one of the different possible groups. The received signal energy of joining the possible group refers to received signal energy or received signal strength, respectively, at the user communication device 101 in case the user communication device 101 has joined the possible group and belongs to the group. The received signal energy of staying ungrouped refers to received signal energy or received signal strength, respectively, at the user communication device 101 in case the user communication 101 does not belong to any of the possible groups, i.e., in case the user communication device 101 alone constitutes a group. By determining or estimating the ratio, the benefit or advantage of joining the respective group by the user communication device 101 is determined or estimated. The received signal energies or strengths are compared for the case the user communication device 101 decides to join the group and for the case the user communication device 101 does not join the group and stays alone, i.e. the user communication device 101 alone represents a group.

According to an embodiment, the user communication device 101 is configured to determine the corresponding estimated ratio of received signal energy of joining the respective possible group over a received signal energy of staying ungrouped by use of the outer precoder matrix of the possible group. In this way, the determination of benefit or advantage of joining the respective group is connected with the criteria of suppression of the interference between the groups determined or generated by the user communication devices 101.

According to an embodiment, if the estimated ratio of received signal energy of joining the possible group of different possible groups among the user communication devices 101 of the neighbor user communication device set over a received signal energy of staying ungrouped is greater than or equal to a predetermined threshold, the user communication device 101 is configured to determine the possible group as the user communication device group that the user communication device 101 will join. However, if, for all different possible groups among the user communication devices of the neighbor user communication device set, the respective estimated ratio of received signal energy of joining the respective possible group over the received signal energy of staying ungrouped is lower than the predetermined threshold, the user communication device 101 is configured to generate a new group as the user communication device group that the user communication device joins. The new group includes, at first, the user communication device 101 only.

The determining 502 of the respective user communication device group is executed differently for one- or single-cell scenario as shown in FIG. 1 and for multiple cell scenario as shown in FIG. 2. Therefore, the determining 500 of the user communication device group will be considered in the following separately for the one- or single-cell scenario (see FIG. 1) and for the multiple cell scenario (see FIG. 2).

In both cases, i.e. in case of the one- or single-cell scenario (see FIG. 1) and in case of the multiple cell scenario (see FIG. 2), each user communication device 101 finds a user communication device group among different possible groups among the user communication devices 101 of the determined 501 neighbor user communication set that provides the highest or maximum estimated ratio of the received signal energy of joining the group over the received signal energy of staying ungrouped. Thus, a user communication device group among different possible groups is determined that provides the most benefit or advantage of joining the respective group by the user communication device 101 in terms of the received signal energy or strength respectively.

In case of the one- or single-cell scenario (see FIG. 1), at the k-th user communication device 100, which determined 501 the neighbor communication device set, for each one of the different possible groups g, the estimated ratio $\eta_k(g)$ of the received signal energy of joining the group g over the received signal energy of staying ungrouped is determined as follows:

$$\eta_k(g) = \frac{tr\{V_g^H R_k V_g\}}{\varphi(R_k, M)}$$

where $V_g$ is an outer precoder matrix of the group g, $V_g^H$ is a Hermitian of the outer precoder matrix $V_g$, $R_k$ is a covariance matrix between the downlink channel between the user communication device 101, which determined 501 the neighbor user communication device set, as a k-th user communication device 101 and the communication network device 102 such as BS or eNodeB, $\varphi(R_k, M)$ is the sum of the largest M eigenvalues of the covariance matrix $R_k$ of the user communication device 101, wherein M is an integer that is greater than or equal to 1, and tr denotes a trace function on the respective matrix. Particularly, $tr\{V_g^H R_k V_g\}$ represents the received signal energy of joining the group g at the user communication device 101, and $\varphi(R_k, M)$ represents the received signal energy of staying ungrouped at the user communication device 101. The group outer precoder matrix $V_g$ can be chosen as M dominant eigenvectors of the covariance matrix of the group g. Here, different known methods can be applied. An example for determining or acquiring the group outer precoder matrix $V_g$ is described in J. Nam, A. Adhikary, J.-Y. Ahn, G. Caire: "Joint spatial division and multiplexing: Opportunistic beamforming, user grouping and simplified downlink scheduling", IEEE J. Sel. Topics Signal Process, Vol. 8, No. 5, pp. 876-890. The teaching of this publication is incorporated herein by reference.

In case of the multiple-cell scenario (see FIG. 2), at the k-th user communication device 100, which determined 501 the neighbor communication device set, for each one of the different possible groups g in a cell b, the estimated ratio $\eta_k(b,g)$ of the received signal energy of joining the group g in the cell b over the received signal energy of staying ungrouped is determined as follows:

$$\eta_k(b, g) = \frac{tr\{V_{b,g}^H R_k^{(b)} V_{b,g}\}}{\varphi(R_k^{(b)}, M)}$$

where $V_{b,g}$ is an outer precoder matrix of the group g in the cell b, $V_{b,g}^H$ is a Hermitian of the outer precoder matrix $V_{b,g}$, $R_k^{(b)}$ is a covariance matrix between the downlink channel between the user communication device 101, which determined 501 the neighbor user communication device set, as a k-th user communication device 101 and the communication network device 102 such as BS or eNodeB in the cell b, $\varphi(R_k^{(b)}, M)$ is the sum of the largest M eigenvalues of the covariance matrix $R_k^{(b)}$ of the user communication device 101, wherein M is an integer that is greater than or equal to 1, and tr denotes a trace function on the respective matrix. Particularly, $tr\{V_{b,g}^H R_k^{(b)} V_{b,g}\}$ represents the received signal energy of joining the group g of the cell b at the user communication device 101, and $\varphi(R_k^{(b)}, M)$ represents the received signal energy in cell b of staying ungrouped at the user communication device 101. The group outer precoder matrix $V_{b,g}$ can be chosen as M dominant eigenvectors of the covariance matrix of the group g. Here, different known methods can be applied. An example for determining or acquiring the group outer precoder matrix $V_{b,g}$ is described in J. Nam, A. Adhikary, J.-Y. Ahn, G. Caire: "Joint spatial division and multiplexing: Opportunistic beamforming, user grouping and simplified downlink scheduling", IEEE J. Sel. Topics Signal Process, Vol. 8, No. 5, pp. 876-890. The teaching of this publication is incorporated herein by reference.

In both cases (i.e. in the one- or single-cell case of FIG. 1 and in the multiple-cell case of FIG. 2), if the highest or maximum estimated energy ratio $\eta_k(g)$ or $\eta_k(b,g)$ is below a threshold $t_n$, the user communication device 101 does not join any of the different possible user communication device groups and stays alone, i.e. generates or forms a new group, which comprises the user communication device 101 only.

The above-described step 502 of determining a user communication device group to be joined is executed by each one of the user communication devices 101, with regard to which the execution of the user communication device grouping is desired.

Subsequently, in both cases (i.e. in the one- or single-cell case of FIG. 1 and in the multiple-cell case of FIG. 2), for each of the determined groups g, a corresponding group leader is selected. Among the different user communication devices 101 of a group g, a user communication device 101 is selected as a group leader that has the best D2D connection in the group g and that has the best uplink channel quality.

After the generation or determining of the user communication device groups 103_1, 103_2, 103_3 by the user communication devices 101, the each one of the group leaders of the user communication device groups 103_1, 103_2, 103_3 transmits information 104_1, 104_2 on the respective user communication device group to the communication network device 102 such as a BS or eNodeB. The information 104_1, 104_2 on a user communication device group comprises a group aggregate covariance matrix, in which covariance matrixes of the user communication devices 101 of the user communication device group are aggregated, wherein each covariance matrix is a covariance matrix of a downlink channel between the respective user communication device 101 of the user communication device group and the communication network device 102 such as BS or eNodeB.

In case of the one- or single-cell scenario (see FIG. 1), the group aggregate covariance matrix $\tilde{R}_g$ is determined as follows:

$$\tilde{R}_g = \frac{1}{|U_g|} \Sigma_{k \in U_g} R_k$$

where $U_g$ represents the user communication devices 102 in the respective user communication device group g, $|U_g|$ represents the number of user communication devices 101 in that group, k represents an index of a user communication device 101 in that group, and $R_k$ represents the respective covariance matrix of the k-th user communication device 101 of that group.

In case of the multiple-cell scenario (see FIG. 2), the group aggregate covariance matrix $\tilde{R}_g^{(b)}$ is determined as follows:

$$\tilde{R}_g^{(b)} = \frac{1}{|U_g|} \sum_{k \in U_g} R_k^{(b)}$$

where $U_g$ represents the user communication devices 102 in the respective user communication device group g, $|U_g|$ represents the number of user communication devices 101 in that group, k represents an index of a user communication device 101 in that group, and $R_k^{(b)}$ represents the respective covariance matrix of the k-th user communication device 101 of that group in cell b.

The determination or calculation of the group aggregate covariance matrix $\tilde{R}_g$ or $\tilde{R}_g^{(b)}$ is executed, according to an embodiment, by the group leader of the respective group g.

Figure 6:
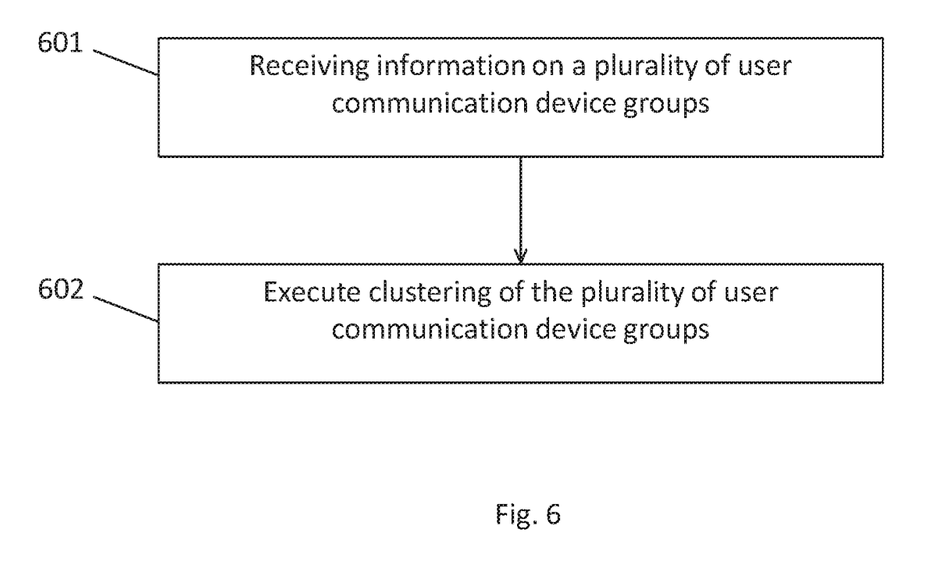
FIG. 6 shows steps executed to support grouping of user communication devices in a communication network according to an embodiment of the present application.

FIG. 6 shows steps executed to support grouping of user communication devices 101 in a communication network according to an embodiment of the present application. The steps of FIG. 6 are executed by a communication network device 102, 200 such as BS, eNodeB, RRM. In particular, said steps are executed by the one or more processing entities 403 of the communication network device 102, 200 such as BS, eNodeB, RRM. FIG. 6 reflects the steps of the above-mentioned phase II.

In step 601, information 104_1, 104_2, 204_1, 204_2 on a plurality of user communication device groups 103_1, 103_2, 103_3 is received by the communication network device 102, 200. In particular, the information 104_1, 104_2, 204_1, 204_2 is received by the receiving entity 402 of the communication network device 102, 200.

In case of the one- or single-cell scenario (see FIG. 1), information 104_1, 104_2 on a plurality of user communication device groups 103_1, 103_2, 103_3 is received by the communication network device 102 such as BS or eNodeB and subsequently processed (i.e. clustered) by the same communication network device 102.

In case of the multi-cell scenario (see FIG. 2), information 104_1, 104_2, 204_1, 204_2 on a plurality of user communication device groups 103_1, 103_2, 103_3 is received by first communication network devices 102 such as BS or eNodeB, which serve the cells, in which the user communication device grouping has been executed by the user communication devices 101. Here, for example, for each one of the user communication groups 103_1, 103_2, 103_3, the respective group leader transmits the information 104_1, 104_2, 204_1, 204_2 to a first communication network device 102 that serves the respective group leader. Subsequently, the first communication network devices 102 such as BS or eNodeB transmit the information 104_1, 104_2, 204_1, 204_2 on the plurality of user communication device groups 103_1, 103_2, 103_3 to a second communication network device 200 such as RRM. The further processing (i.e. clustering) of the user communication device groups 103_1, 103_2, 103_3 is executed then by the second communication network device 200 such as RRM.

In step 602, clustering of the plurality of user communication device groups is executed by the communication network device 102, 200 such as BS, eNodeB, RRM. As mentioned above, for this purpose, various known clustering algorithms can be used. Such known clustering algorithms comprise, for example, the K-means algorithm or merge-and-split algorithms. However, also further appropriate known clustering algorithms can be used. During the clustering 602, at least two of the plurality of the user communication device groups are joined to one user communication device group.

Figure 7:
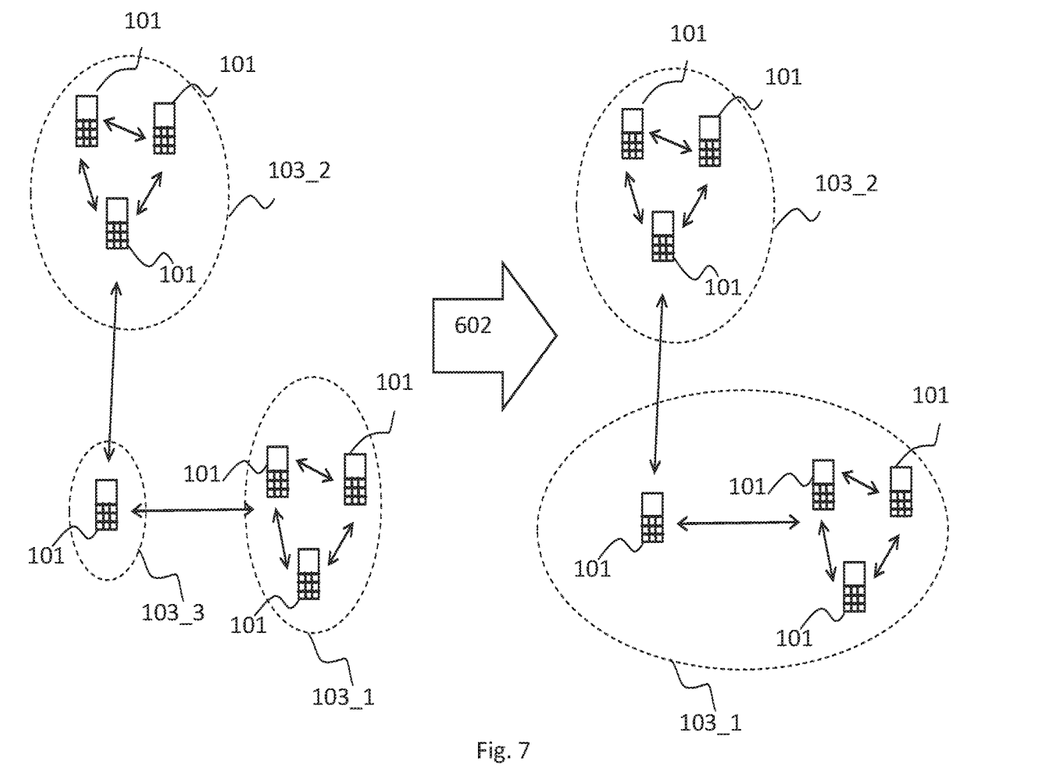
FIG. 7 shows exemplary a joining of two of the plurality of the user communication device groups to one user communication group according to an embodiment of the present application.

FIG. 7 shows exemplary a joining of two user communication device groups 103_1, 103_3 of the plurality of the user communication device groups 103_1, 103_2, 103_3 to one user communication group 103_1' according to an embodiment of the present application. On the left side, user communication device groups 103_1, 103_3 as determined or generated by the user communication devices 101 (e.g., by executing the steps of FIG. 5) are shown. By the execution 602 of the clustering, the user communication device groups 103_1', 103_2 are obtained. The obtained user communication device groups 103_1', 103_2 are shown on the right side of FIG. 7. During the execution 602 of the clustering, the user communication device groups 103_1, 103_3 have been joined to one user communication device group 103_1'.

In the following, the execution of the clustering by use of the K-means algorithm will be considered exemplary.

In case of the one- or single-cell scenario (see FIG. 1), each user communication group 103_1, 103_2, 103_3, generated or determined by the user communication devices 101 (e.g., by executing steps of FIG. 5), is considered as a virtual user communication device i with covariance matrix $$\tilde{R}_i = \frac{1}{|U_i|} \Sigma_{k \in U_i} R_k,$$

the covariance matrix $\tilde{R}_i$ being the aggregate covariance matrix of the respective group and being assumed as representing a covariance matrix of a downlink channel between the virtual user communication device i and the communication network device 102 such as BS or eNodeB.

The clustering of the virtual user communication devices i (or user communication groups 103_1, 103_2, 103_3, respectively) into G groups by use of the corresponding covariance matrices $\tilde{R}_1, \tilde{R}_2, \ldots$ is then executed as follows:

Firstly, G matrices are randomly selected from all covariance matrices $\tilde{R}_1, \tilde{R}_2, \ldots$ as group centers, which are denoted as $\tilde{R}_g^C$ for groups g=1, 2, ..., G.

Secondly, for each virtual user communication device i, to the group $i \rightarrow \tilde{U}_g$ a minimum chordal distance $\min_g d(\tilde{R}_g^C, \tilde{R}_i)$ is assigned, where $$d(R_1, R_2) = \|U_1 U_1^H - U_2 U_2^H\|_F,$$

and $U_1$ denotes the matrix containing M dominant eigenvectors of $R_1$.

Secondly, assign each virtual user communication device i to the group g, $i \rightarrow \tilde{U}_g$, that minimizes the chordal distance $d(\tilde{R}_g^C, \tilde{R}_i)$ between virtual device i and group g, where $$d(\tilde{R}_g^C, \tilde{R}_i) = \|U_g^C (U_g^C) - U_i U_i^H\|_F$$

in which, $U_g^C$ denotes the matrix containing the M dominant eigenvectors of $\tilde{R}_g^C$, and $U_i$ denotes the matrix containing the M dominant eigenvectors of $\tilde{R}_i$.

Thirdly, for each one of the groups, the group center $\tilde{R}_g^C$ is updated as follows:

$$\tilde{R}_g^C = \frac{1}{|\tilde{U}_g|} \Sigma_{i \in \tilde{U}_g} \tilde{R}_i$$

Fourthly, the second and the third step are repeated until a convergence of each one of the updated group centers.

The final grouping is then given by $U''_g = \{k: k \in U_i, i \in \tilde{U}_g\}$.

In case of the multi-cell scenario (see FIG. 2), each user communication group 103_1, 103_2, 103_3, generated or determined by the user communication devices 101 (e.g., by executing steps of FIG. 5), is considered as a virtual user communication device i with covariance matrix $$\tilde{R}_i^{(b)} = \frac{1}{|U_i|} \sum_{k \in U_i} R_k^{(b)}$$

and a mean channel gain $$\tilde{\rho}_i^{(b)} = \frac{1}{|U_i|} \sum_{k \in U_i} \rho_k^{(b)}$$

The covariance matrix $\tilde{R}_i^{(b)}$ is the aggregate covariance matrix of the respective group and being assumed as representing a covariance matrix of a downlink channel between the virtual user communication device i and the communication network device 102 such as BS or eNodeB.

The clustering of the virtual user communication devices i (or user communication groups 103_1, 103_2, 103_3, respectively) into G groups for each cell b=1, 2, ..., B is then executed as follows, wherein an assignment of virtual user communication devices i→$\tilde{U}_{b,g}$ is executed:

Firstly, in an initial assignment, G rounds are executed. For the first round, at a first communication network device 102 such as BS or eNodeB (i.e. g=1 and b=1) a virtual user communication device $$i^*(1, 1) = \arg\max_i \tilde{\rho}_i^{(1)}$$

is chosen. For each round g=1, 2, ..., G, each communication network device 102 such as BS or eNodeB picks a virtual user communication device according to $$i^*(b, g) = \arg \min_i \frac{1}{\tilde{\rho}_i^{(b)}} \sum_{l=1}^{g-1} \sum_{c=1}^{b-1} \frac{\tilde{\rho}_i^{(c)}}{d(\tilde{R}_{i^*(c,l)}^{(c)}, \tilde{R}_i^{(c)})}$$

Secondly, a clustering is then executed by assigning each virtual user communication device i to a group g in cell b according to:

$$(b^*, g^*) = \arg \min_{(b,g)} d(\tilde{R}_{i^*(b,g)}^{(b)}, \tilde{R}_i^{(b)})$$

Thirdly, a centering is executed by performing the following two steps. The center of the first group in the first cell (1,1) is updated by choosing a virtual user communication device within the group $\tilde{U}_{1,1}$ according to $$i^*(1.1) = \arg \min_{i \in \tilde{U}_{1,1}} \frac{1}{\tilde{\rho}_i^{(b)}} \sum_{(c,l) \neq (1,1)} \frac{\tilde{\rho}_i^{(c)}}{d(\tilde{R}_{i^*(c,l)}^{(c)}, \tilde{R}_i^{(c)})}$$

and the center of the other groups (b,g) is updated sequentially according to:

$$i^*(b, g) = \arg \min_{i \in \tilde{U}_{b,g}} \frac{1}{\tilde{\rho}_i^{(b)}} \sum_{l=1}^{g-1} \sum_{c=1}^{b-1} \frac{\tilde{\rho}_i^{(c)}}{d(\tilde{R}_{i^*(c,l)}^{(c)}, \tilde{R}_i^{(c)})}$$

Fourthly, the second and the third step are repeated until a convergence of each one of the updated group centers.

The application has been described in conjunction with various embodiments herein. The various embodiments of the present application are combinable with each other. I.e. any embodiment of the embodiments, described herein, shown in at least one of the figures, and/or claimed in appended claims, is combinable with another embodiment of said embodiments. Thus, a flexible implementation of the present application is enabled. Furthermore, the implementation of the present application can be adapted to several environments or use cases.

The present application is directed to a user communication device and to a communication network device, both arranged to support grouping of user communication devices in a communication network. The user communication device determines a neighbor user communication device set comprising the user communication device and neighbor user communication devices and determines, by communicating with neighbor user communication devices of the neighbor user communication device set via D2D communication, a user communication device group that the user communication device joins. The communication network device receives information on a plurality of user communication device groups, determined by user communication devices in the communication network, and executes clustering on the plurality of user communication device groups.

As shown above, the application exploits the proximity information at the user side and uses local cooperation for grouping improvement and feedback reduction. The interpretation is the following. First, user communication devices know their neighbors via D2D communication. Due to local scattering, user communication devices that are close to each other might be better grouped together. Such initial grouping does not require the coordination from the communication network device such as BS or eNodeB. As a result, the communication network device such as BS or eNodeB can enjoy reduced computational complexity but achieve even better grouping result. Second, local cooperation among user communication devices results in an initial merge of users into small groups, and consequently skip redundant feedback to the communication network device such as BS or eNodeB.

The application can be applied to a wide range of application scenarios, such as single cell massive MIMO networks and multi-cell networks.

Although the multi-cell case has been considered above with regard to FIG. 2 only, in fact, there are two ways to handle the multi-cell case. According to the first way, a user-cell association is executed, then, the multi-cell case is decoupled into the one- or single-cell case (see FIG. 1) by processing each cell individually. According to the second way, a joint user grouping and cell association is executed; see FIG. 2.

It has to be noted that any of the embodiments and features of any of the embodiments, described herein, may be combined with each other, unless a combination is explicitly excluded.

Additionally, also other variations to the enclosed embodiments can be understood and effected by those skilled in the art and practicing the claimed application, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A user communication device arranged to support grouping of user communication devices in a communication network, wherein the user communication device is configured to communicate with further user communication devices in the communication network via a device-to-device (D2D) communication, and wherein the user communication device is additionally configured to communicate with the further user communication devices via a communication network device, wherein the user communication device comprises at least one processor, wherein the at least one processor is configured to couple with a memory, read an instruction in the memory, and execute the following when supporting the grouping of user communication devices in the communication network:
   determining a neighbor user communication device set comprising the user communication device and neighbor user communication devices, wherein the neighbor user communication devices are arranged to communicate in the communication network, and wherein the neighbor user communication devices are adjacent to the user communication device in the communication network; and
   determining, by causing a transceiver to communicate with the neighbor user communication devices of the neighbor user communication device set via the D2D communication, among user communication devices of the neighbor user communication device set a user communication device group that the user communication device joins, wherein information on the user communication device group is provided to the communication network device, wherein the information on the user communication device group comprises a group aggregate covariance matrix, in which covariance matrixes of the user communication devices of the user communication device group are aggregated, and wherein each covariance matrix is a covariance matrix of a downlink channel between the respective user communication device of the user communication device group and the communication network device.

2. The user communication device according to claim 1, wherein the at least one processor is configured to determine the user communication device group by analyzing different possible groups among the user communication devices of the neighbor user communication device set.

3. The user communication device according to claim 2, wherein:
   if an estimated ratio of received signal energy of joining a possible group of different possible groups among the user communication devices of the neighbor user communication device set over a received signal energy of staying ungrouped is greater than or equal to a predetermined threshold, the at least one processor is configured to determine the possible group as the user communication device group that the user communication device joins; and
   if, for all different possible groups among the user communication devices of the neighbor user communication device set, a respective estimated ratio of received signal energy of joining the respective possible group over the received signal energy of staying ungrouped is lower than the predetermined threshold, the at least one processor is configured to generate a new group as the user communication device group that the user communication device joins.

4. The user communication device according to claim 2, wherein the at least one processor is configured to determine an estimated ratio of received signal energy of joining a possible group of different possible groups among the user communication devices of the neighbor user communication device set over the received signal energy of staying ungrouped as follows:

$$\eta_k(g) = \frac{tr\{V_g^H R_k V_g\}}{\varphi(R_k, M)},$$

wherein $\eta_k(g)$ is the estimated ratio of received signal energy of joining the respective possible group over the received signal energy of staying ungrouped, wherein g is the respective possible group, wherein k refers to the user communication device as the k-th user communication device of the neighbor user communication device set, wherein $V_g$ is an outer precoder matrix of the respective possible group, wherein $V_g^H$ is a Hermitian of the outer precoder matrix $V_g$, wherein $R_k$ is a covariance matrix of a downlink channel between the user communication device and the communication network device, wherein $\varphi(R_k, M)$ is a sum of largest M eigenvalues of the covariance matrix $R_k$, and wherein M is an integer that is greater than or equal to 1.

5. The user communication device according to claim 2, wherein, if user communication devices of a possible group of different possible groups among the user communication devices of the neighbor user communication device set is located in a cell of the communication network that is different from a cell, in which the user communication device is located, the at least one processor is configured to determine an estimated ratio of received signal energy of joining the respective possible group of different possible groups among the user communication devices of the neighbor user communication device set over the received signal energy of staying ungrouped as follows:

$$\eta_k(b, g) = \frac{tr\{V_{b,g}^H R_k^{(b)} V_{b,g}\}}{\varphi(R_k^{(b)}, M)},$$

wherein $\eta_k(b,g)$ is the estimated ratio of received signal energy of joining the respective possible group g in the cell b, in which the user communication devices of the respective possible group g are located, over the received signal energy of staying ungrouped, wherein k refers to the user communication device as the k-th user communication device of the neighbor user communication device set, wherein $V_{b,g}$ is an outer precoder matrix of the respective possible group in the cell b, wherein $V_{b,g}^H$ is a Hermitian of the outer precoder matrix $V_{b,g}$, $R_k^{(b)}$ is a covariance matrix of a downlink channel between the user communication device and the communication network device in the cell b, wherein $\varphi(R_k^{(b)}, M)$ is a sum of largest M eigenvalues of the covariance matrix $R_k^{(b)}$, and wherein M is an integer that is greater than or equal to 1.

6. The user communication device according to claim 1, wherein, after joining the user communication device group, the at least one processor is configured to cause the transceiver to transmit its covariance matrix to at least one user communication device of the user communication device group.

7. The user communication device according to claim 1, wherein the user communication device is a group leader of the user communication device group if the user communication device has, among the user communication devices of the user communication device group, the best D2D connection and the best uplink channel quality.

8. The user communication device according to claim 1, wherein, if the user communication device is a group leader of the user communication device group, the at least one processor is configured to cause the transceiver to transmit the information on the user communication device group to the communication network device.

9. The user communication device according to claim 1, wherein the group aggregate covariance matrix is determined as follows:

$$\tilde{R}_g = \frac{1}{|\mathcal{U}_g|} \Sigma_{k \in \mathcal{U}_g} R_k,$$

wherein $\tilde{R}_g$ is the group aggregate covariance matrix, wherein $R_k$ is a covariance matrix of a downlink channel between the k-th user communication device of the user communication device group and the communication network device, and wherein $\mathcal{U}_g$ is the user communication device group.

10. The user communication device according to claim 1, wherein the at least one processor is configured to acquire, for a possible group of different possible groups among the user communication devices of the neighbor user communication device set, an outer precoder matrix of the possible group and to decide, based on the outer precoder matrix of the possible group, whether the user communication device will join the possible group.

11. The user communication device according to claim 10, wherein the at least one processor is configured to determine a corresponding estimated ratio of received signal energy of joining the respective possible group over a received signal energy of staying ungrouped by use of the outer precoder matrix of the possible group.

12. The user communication device according to claim 1, wherein the at least one processor is configured to determine, for a possible group of different possible groups among the user communication devices of the neighbor user communication device set, a corresponding estimated ratio of received signal energy of joining the possible group over a received signal energy of staying ungrouped and to decide, based on the corresponding estimated ratio, whether the user communication device will join the possible group.

13. A method arranged to support grouping of user communication devices in a communication network and arranged for execution by a user communication device, wherein the user communication device is configured to communicate with further user communication devices in the communication network via a device-to-device (D2D) communication and is additionally configured to communicate with the further user communication devices via a communication network device, wherein the method comprises the following steps for supporting the grouping of user communication devices in the communication network:

determining a neighbor user communication device set comprising the user communication device and neighbor user communication devices, wherein the neighbor user communication devices are arranged to communicate in the communication network, and wherein the neighbor user communication devices are adjacent to the user communication device in the communication network; and determining, by communicating with the neighbor user communication devices of the neighbor user communication device set via the D2D communication, among user communication devices of the neighbor user communication device set a user communication device group that the user communication device joins, wherein information on the user communication device group is provided to the communication network device, wherein the information on the user communication device group comprises a group aggregate covariance matrix, in which covariance matrixes of the user communication devices of the user communication device group are aggregated, and wherein each covariance matrix is a covariance matrix of a downlink channel between the respective user communication device of the user communication device group and the communication network device.

14. A communication network device arranged to support grouping of user communication devices in a communication network, wherein the communication network device comprises at least one processor, wherein the at least one processor is configured to couple with a memory, read an instruction in the memory, and execute the following:

causing a transceiver to receive information on a plurality of user communication device groups, determined by user communication devices in the communication network, wherein information on a user communication device group of the plurality of user communication device groups comprises a group aggregate covariance matrix, in which covariance matrixes of user communication devices of the user communication device group are aggregated, and wherein each covariance matrix is a covariance matrix of a downlink channel between the respective user communication device of the user communication device group and the communication network device; and execute clustering on the plurality of user communication device groups.

15. The communication network device according to claim 14, wherein the at least one processor is configured to join at least two user communication device groups of the plurality of user communication device groups to one user communication device group when executing the clustering.

16. The communication network device according to claim 14, wherein the at least one processor is configured to execute the clustering by executing K-means based algorithm or a graphical algorithm on the plurality of user communication device groups.

17. The communication network device according to claim 14, wherein the at least one processor is configured to cause the transceiver to receive for each user communication device group of the plurality of user communication device groups corresponding information on the respective user communication device group.

18. The communication network device according to claim 17, wherein the at least one processor is configured to cause the transceiver to receive the corresponding information on the respective user communication device group from a user communication device of the user communication device group.

* * * * *

UNITED STATES PATENT AND TRADEMARK OFFICE
CERTIFICATE OF CORRECTION

PATENT NO. : 10,893,394 B2
APPLICATION NO. : 16/395048
DATED : January 12, 2021
INVENTOR(S) : Junting Chen and David Gesbert It is certified that error appears in the above-identified patent and that said Letters Patent is hereby corrected as shown below:

In the Claims

In Column 20, Line 66, in Claim 5, delete "gin" and insert -- g in --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*